United States Patent
Lee et al.

(10) Patent No.: US 11,867,263 B2
(45) Date of Patent: Jan. 9, 2024

(54) LINEAR ACTUATORS, MOTOR ASSEMBLIES, AND METHODS TO ACTUATE A DEVICE OR LOAD

(71) Applicant: Halliburton Energy Services, Inc., Houston, TX (US)

(72) Inventors: Shao Hwa Lee, Singapore (SG); Bruce Edward Scott, Carrollton, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 17/736,489

(22) Filed: May 4, 2022

(65) Prior Publication Data

US 2023/0358300 A1 Nov. 9, 2023

(51) Int. Cl.
*E21B 23/00* (2006.01)
*F16H 25/22* (2006.01)
*E21B 34/06* (2006.01)
*F16H 25/20* (2006.01)

(52) U.S. Cl.
CPC ........ *F16H 25/2204* (2013.01); *E21B 34/066* (2013.01); *F16H 2025/204* (2013.01); *F16H 2025/2043* (2013.01); *F16H 2025/2062* (2013.01)

(58) Field of Classification Search
CPC ..... F16H 2025/2062; F16H 2025/2043; F16H 2025/204; F16H 25/2204; E21B 23/001
See application file for complete search history.

(56) References Cited

U.S. PATENT DOCUMENTS

| | | | |
|---|---|---|---|
| 6,928,895 B2 | 8/2005 | Davies et al. | |
| 8,910,720 B2 * | 12/2014 | Aguirre | E21B 23/14 166/241.1 |
| 2017/0356261 A1 * | 12/2017 | Wai | E21B 23/01 |

FOREIGN PATENT DOCUMENTS

| | | | | |
|---|---|---|---|---|
| CN | 103703280 A | * | 4/2014 | ............ F16H 25/20 |
| CN | 103703280 B | | 9/2017 | |
| KR | 101428536 B1 | * | 6/2014 | |
| KR | 10-1428536 B1 | | 8/2014 | |
| WO | 2005050062 A1 | | 6/2005 | |
| WO | WO-2005050062 A1 | * | 6/2005 | ......... F16H 25/2021 |
| WO | 2020-235726 A1 | | 11/2020 | |

(Continued)

OTHER PUBLICATIONS

International Search Report & Written Opinion in PCT/US2022/028623 dated Feb. 1, 2023.

(Continued)

*Primary Examiner* — Randell J Krug
(74) *Attorney, Agent, or Firm* — Barnes & Thornburg LLP

(57) ABSTRACT

Linear actuators, motor assemblies, and methods to actuate a device or load are presented. A linear actuator includes a piston having a piston slot and configured to linearly shift from a first position to a second position, and rotate as the piston shifts towards the first position. The linear actuator also includes an activating lever having a shoulder that the piston engages as the piston shifts to the second position, where the activating lever is configured to shift after piston engages the shoulder. The linear actuator also includes a retractable rail configured to shift from a first position downwards to a second position, and having a tab positioned in a groove of the piston slot as the piston shifts from the first position to the second position.

24 Claims, 9 Drawing Sheets

(56) References Cited

FOREIGN PATENT DOCUMENTS

| WO | WO-2020235726 A1 | * | 11/2020 |
| WO | 2021034200 A1 | | 2/2021 |
| WO | 2021256934 A1 | | 12/2021 |

OTHER PUBLICATIONS

Search Report in NL Application No. 2034439, dated Aug. 23, 2023.

* cited by examiner

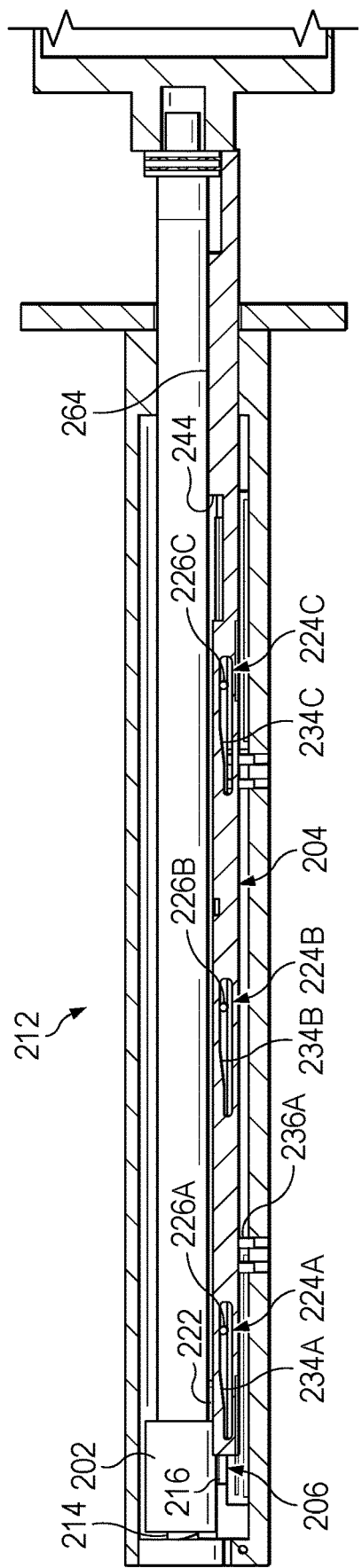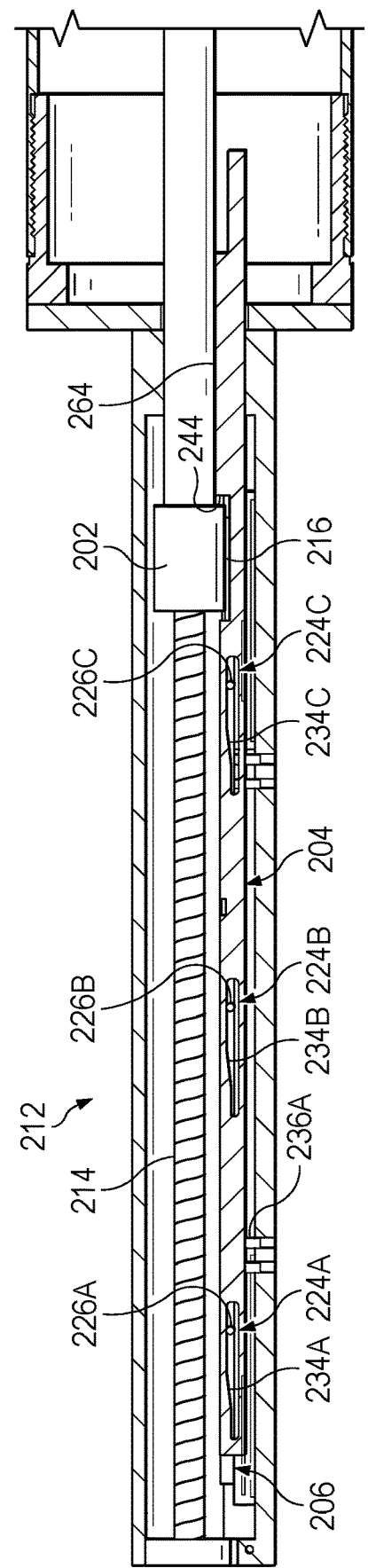
FIG. 4A
FIG. 4B

LINEAR ACTUATORS, MOTOR ASSEMBLIES, AND METHODS TO ACTUATE A DEVICE OR LOAD

BACKGROUND

The present disclosure relates generally to linear actuators, motor assemblies, and methods to actuate a device or load.

Wellbores are sometimes drilled from the surface of a wellsite several hundred to several thousand feet downhole to reach hydrocarbon resources. Downhole actuators are sometimes used to open and close valves, set packers, facilitate fluid flow, drive or actuate loads, and perform other downhole operations.

BRIEF DESCRIPTION OF THE DRAWINGS

Illustrative embodiments of the present disclosure are described in detail below with reference to the attached drawing figures, which are incorporated by reference herein, and wherein:

FIG. 4A is a side view of the linear actuator of FIG. 2 while the piston is in a first piston position;

FIG. 4B is a side view of the linear actuator of FIG. 2 after the piston has shifted from the first piston position to a second piston position;

Figure 1:
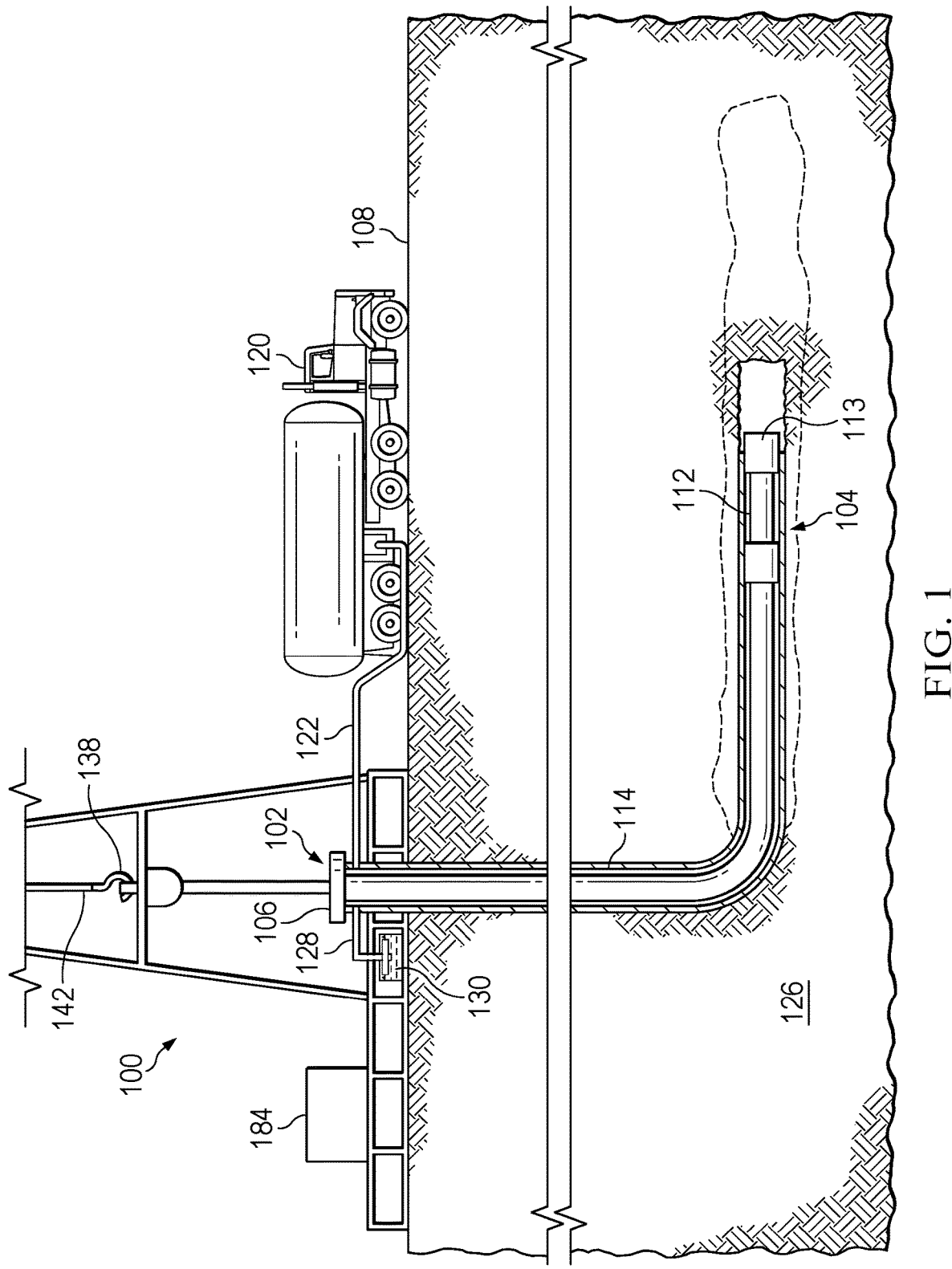
FIG. 1 is a schematic, side view of a well environment in which a motor assembly having a linear actuator is deployed in the wellbore.

The illustrated figures are only exemplary and are not intended to assert or imply any limitation with regard to the environment, architecture, design, or process in which different embodiments may be implemented.

DETAILED DESCRIPTION

In the following detailed description of the illustrative embodiments, reference is made to the accompanying drawings that form a part hereof. These embodiments are described in sufficient detail to enable those skilled in the art to practice the invention, and it is understood that other embodiments may be utilized and that logical structural, mechanical, electrical, and chemical changes may be made without departing from the spirit or scope of the invention. To avoid detail not necessary to enable those skilled in the art to practice the embodiments described herein, the description may omit certain information known to those skilled in the art. The following detailed description is, therefore, not to be taken in a limiting sense, and the scope of the illustrative embodiments is defined only by the appended claims.

The present disclosure relates to linear actuators, motor assemblies, and methods to actuate a device or load. A linear actuator includes a piston, an activating lever, and a retractable rail. The piston is configured to linearly shift from a first piston position to a second piston position, and rotate as the piston shifts towards the first piston position. FIGS. 4A and 4B, for example, illustrate the piston in the first piston position and the second piston position, respectively. As referred to herein, an apparatus or component linearly shifts if the apparatus or component travels in a linear or substantially linear direction (e.g., left to right, right to left, downwards, upwards, up a slope, down a slope, etc.) without rotating or substantially rotating. The piston is coupled to or engaged to a ball screw, a lead screw, a roller screw, or another component or device configured to translate rotational motion (e.g., from gears of a gearbox or a motor) to linear motion. In some embodiments the ball screw is configured to rotate in a first direction (e.g., clockwise direction) to linearly shift the piston from the first piston position to the second piston position. In some embodiments, the ball screw is also configured to rotate in a second direction that is opposite the first direction (e.g., counterclockwise) to linearly shift the piston towards the first piston position. The piston has a piston slot within which a retractable rail tab of a retractable rail is positioned while the piston linearly shifts from the first piston position to the second piston position. As referred to herein, a tab is any protrusion that is configured to slide, insert, or couple to a slot, opening, or concave region of another component. Examples of tabs, including a rail tab, a piston tab, and other tabs having different dimensions are provided in the paragraphs below and are illustrated in at least FIGS. 3 and 4A-4G, 5, 6A, 6B, 7A, and 7B. Similarly, additional descriptions of the piston, components of the piston, and movements of the piston are provided in the paragraphs below and are illustrated in at least FIGS. 3 and 4A-4G, 5, 6A, 6B, 7A, and 7B.

The retractable rail has a rail tab that is positioned in a groove of the piston slot as the piston linearly shifts from the first piston position to the second piston position to prevent the piston from rotating while the piston linearly shifts from the first piston position to the second piston position. In some embodiments, the coupling or engagement of the rail tab and the piston slot form an anti-rotation mechanism to prevent the piston from rotating as the piston linearly shifts from the first piston position to the second piston position.

In some embodiments, the retractable rail has one or more protrusions that extrude from one or both sides of the retractable rail. In some embodiments, the protrusions of the retractable rail are pins or tabs that extrude from the sides of the retractable rail. The protrusions slide within one or more openings of the activating lever, such that movement of the activating lever from a first activating lever position to a second activating lever position applies a force on the protrusions to push or shift the retractable rail from a first retractable rail position, where the rail tab and the piston slot are coupled or engaged to each other, to a second retractable rail position, where the rail tab and the piston slot are not coupled or engaged to each other. In some embodiments, the retractable rail is coupled to a spring that is compressed when the retractable rail shifts from the first retractable rail position to the second retractable rail position. In one or more of such embodiments, as the spring returns to a natural state, force generated by the spring shifts the retractable rail from the second retractable rail position to the first retractable rail position. Additional descriptions of the retractable rail, components of the retractable rail, and movements of the retractable rail are provided in the paragraphs below and are illustrated in at least FIGS. 3 and 4A-4G, 5, 6A, 6B, 7A, and 7B.

The activating lever has a slot that is configured to receive the piston tab as the piston linearly shifts from the first piston position to the second piston position. In some embodiments, the activating lever slot receives the piston tab before the piston reaches the second piston position to form an anti-rotation mechanism to prevent the piston from rotating as the piston linearly shifts from the first piston position to the second piston position. The activating lever also has a shoulder (first shoulder) that the piston engages as the piston linearly shifts to the second piston position. FIG. 4B, for example, illustrates the moment the piston reaches the second piston position and engages the first shoulder of the activating lever. As the piston continues to shift from the second piston position to a third piston position that is further away from the first piston position, force applied by the piston to the first shoulder of the activating lever also shifts the activating lever from a first activating lever position (the activating lever's original position before the piston linearly shifts to the second piston position) to a second activating lever position. The activating lever also has one or more openings along one or both sides of the activating lever, where each opening has a sloped profile. As the activating lever shifts from the first activating lever position to the second activating lever position, the activating lever applies a force onto the protrusions of the retractable rail, and shifts the retractable rail from the first retractable rail position to the second retractable rail position to disengage the retractable rail tab from the piston slot. Although the retractable rail tab and the piston slot no longer provide an anti-rotation mechanism while the retractable rail is in the second retractable rail position, the piston is prevented from rotating while the piston tab is coupled to or engaged to the activating lever slot, which provides a second anti-rotation mechanism.

Figure 4C:
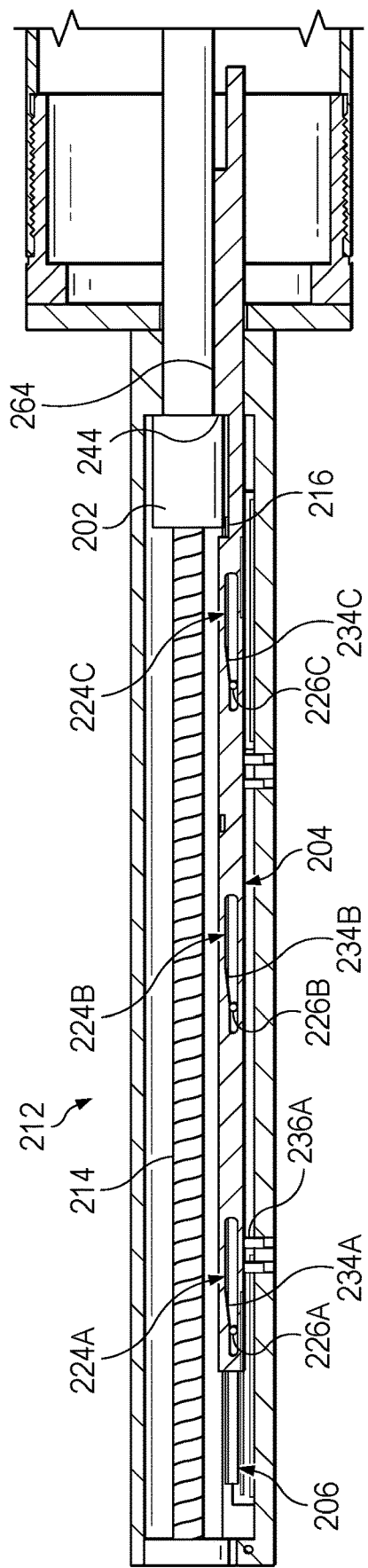
FIG. 4C is a side view of the linear actuator of FIG. 2 after the piston has shifted from the second piston position to a third piston position.
Figure 4D:
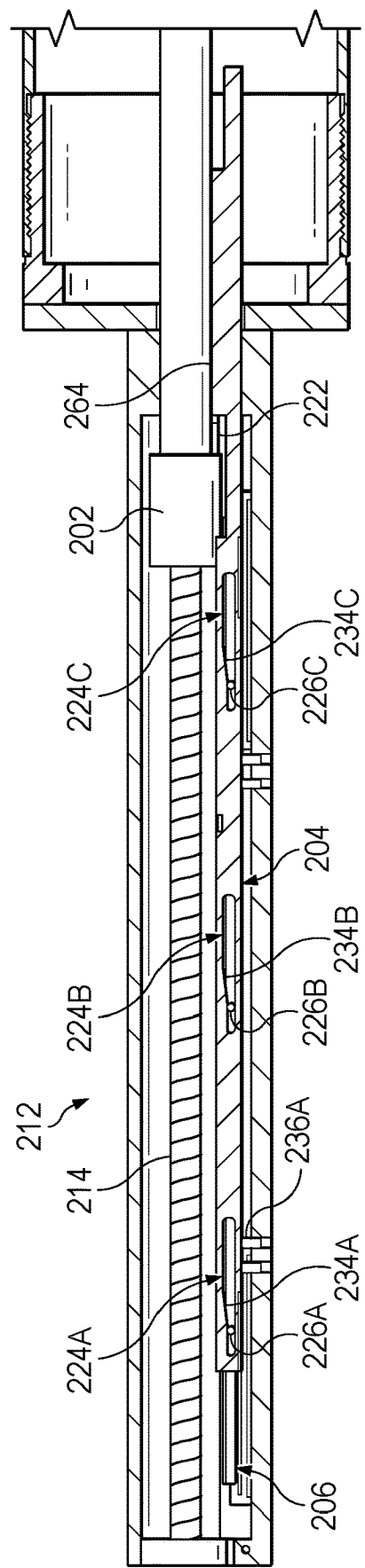
FIG. 4D is a side view of the linear actuator of FIG. 2 after the piston has shifted from the third piston position to a fourth piston position and towards the first piston position.

The piston reaches a fully extended position once the piston reaches the third piston position. FIG. 4C, for example, illustrates the moment the piston has reached the third piston position, and is in a fully extended state. The piston tab and the activating lever slot remain coupled or engaged to each other to prevent the piston from rotating. After the piston reaches the third piston position, the piston linearly shifts from the third piston position towards a fourth piston position that is closer to the first piston position than the third piston position. However, the activating lever remains in the second activating lever position while the piston shifts from the third piston position to the fourth piston position, which is a piston position between the third piston position and the first piston position, and at which the piston tab is no longer coupled to or engaged with the activating lever slot. FIG. 4D, for example, illustrates the moment the piston tab has completely backed out from the activating lever slot. At this moment, the retractable rail is still in the second retractable rail position, and the retractable rail tab is not coupled or engaged to the piston tab to provide an anti-rotation mechanism. As such, the piston rotates as the piston continues to travel from the fourth piston position to a fifth piston position that is between the fourth piston position and the first piston position.

As the piston travels to the fifth piston position, which is the position at which a threshold force is applied to a second shoulder of the activating lever (e.g., applied by a load that is coupled to the piston), force applied to the second shoulder of the activating lever shifts the activating lever from the second activating lever position to the first activating lever position. FIG. 4F, for example, illustrates the moment a load that is coupled to the piston engages the second shoulder of the activating lever. Force applied by the load on the second shoulder of the activating lever continues to shift the activating lever from the second activating lever position towards the first activating lever position while the piston rotates as the piston shifts from the fifth piston position towards the first piston position until the piston returns to the first piston position, at which, the activating lever has also returned to the first activating lever position. FIG. 4G, for example, illustrates the piston returning to the first piston position. Moreover, the activating lever tab is now coupled to or engaged to the piston slot to form an anti-rotation mechanism to prevent rotation of the piston while the activating lever tab is coupled to or engaged to the piston slot. The foregoing processes are repeated during subsequent piston strokes to shift the piston from the first piston position to the second piston position, from the second piston position to the third piston position, from the third piston position to the fourth piston position, from the fourth piston position to the fifth piston position, and from the fifth piston position back to the first piston position.

The motor assembly includes the linear actuator described herein, a motor, gear box, and brake, which are coupled or engaged to the actuator assembly to supply motive power to the linear actuator to shift the piston (e.g., through ball screw), to hold the piston in a desired position, and to control the speed at the piston and ball screw linearly shifts or rotates. In the embodiments where the motor assembly is coupled to or engaged to a device (e.g., packer, valve, or another device), the motor assembly is configured to actuate the device (e.g., set the packer, open the valve, etc.) as the piston extends from the first piston position to the third piston position. In one or more of such embodiments, where the motor assembly is coupled to or engaged to a valve, the motor assembly is also configured to close the valve as the piston shifts from the third piston position back to the first piston position. In some embodiments, where the motor assembly is coupled to or engaged to a load, the motor assembly is also configured to shift the load as the piston shifts from the first piston position to the third piston position. Additional descriptions of linear actuators, motor assemblies, and methods to actuate a device or load are provided in the paragraphs below and are illustrated in FIGS. 1-9.

Turning now to the figures, FIG. 1 is a schematic, side view of a well environment 100 in which a motor assembly 104 having a linear actuator 112 and coupled to a device or load 113 is deployed in a wellbore 114. As shown in FIG. 1, wellbore 114 extends from surface 108 of well 102 to or through formation 126. A hook 138, a cable 142, traveling block (not shown), and hoist (not shown) are provided to lower conveyance 116 (such as a work string), motor assembly 104 and device or load 113 down wellbore 114 of well 102.

An inlet conduit 122 is coupled to a fluid source 120 to provide fluids into well 102 and formation 126. In the embodiment of FIG. 1, fluids are circulated into well 102 and back toward surface 108. To that end, a diverter or an outlet conduit 128 may be connected to a container 130 at the wellhead 106 to provide a fluid return flow path from wellbore 114.

In the embodiment of FIG. 1, a motor (not shown) of the motor assembly 104 provides motive power to shift a piston (not shown) of linear actuator 112 from a first piston position to a third piston position to actuate device or load 113, which is coupled or engaged to the piston or another component of linear actuator 112. For example, where device or load 113 is a valve, motor assembly 104 performs operations described herein to shift the piston from the first piston position to the third piston position to open the valve. Similarly, motor assembly 104 performs operations described herein to shift the piston from the third piston position back to the first piston position to close the valve. In another example, where device or load 113 is a packer, motor assembly 104 performs operations described herein to shift the piston from the first piston position to the third piston position to set the packer. In the embodiment of FIG. 1, motor assembly 104 also has a brake (not shown) that is engaged to overcome any back drive force applied by device or load 113 to hold linear actuator 112 in position, such as the position illustrated in FIG. 4C.

In the embodiment of FIG. 1, motor assembly 104 is communicatively connected to a controller 184 via telemetry. As referred to herein, controller 184 is any electronic device having one or more processors and configured to instruct motor assembly 104 to perform one or more operations described herein. Controller 184 provides instructions to motor assembly 104 to run one or more motors of motor assembly 104, adjust the speed of the motors, apply brake, and perform operations described herein. In some embodiments, controller 184 is an internal component of motor assembly 104 and is housed within a housing of motor assembly 104. In some embodiments, controller 184 is positioned in a downhole location.

Although FIG. 1 illustrates a cased wellbore, motor assembly 104 illustrated in FIG. 1, as well as other motor assemblies described herein, are deployable in open-hole wellbores, cased wellbores, open-hole wellbores of offshore wells, and in surface-based environments. Further, although FIG. 1 illustrates a single motor assembly 104 deployed in well 102, in some embodiments, multiple motor assemblies (not shown) are simultaneously deployed in well 102 to perform operations described herein to actuate multiple devices or loads. Further, although motor assembly 104 includes a single linear actuator 112, in some embodiments, the motor(s) of motor assembly supply motive power to multiple linear actuators (not shown) to perform operations described herein to actuate multiple devices or loads. Additional descriptions of motor assemblies, components of the motor assemblies, and operations performed by components of the motor assemblies are provided herein and are illustrated in at least FIGS. 2-9.

Figure 2:
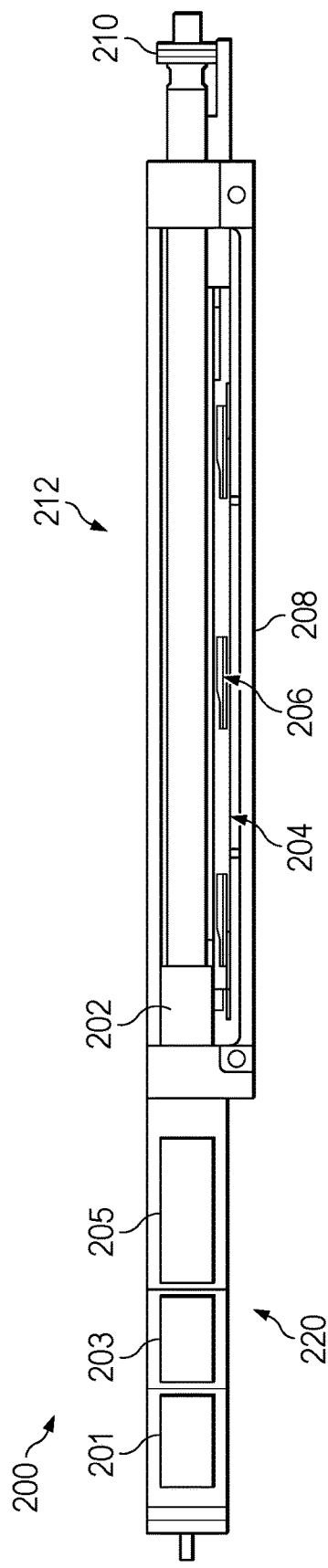
FIG. 2 is a schematic, side view of a motor assembly similar to the motor assembly of FIG. 1.

FIG. 2 is a schematic, side view of a motor assembly 200 similar to motor assembly 104 of FIG. 1. In the embodiment of FIG. 2, motor assembly 200 includes a linear actuator 212 having a piston 202, an activating lever 204, and a retractable rail 206 that are mostly positioned within a chassis 208. Linear actuator 212 also includes a ball screw (not shown) that is positioned within an interior of piston 202. Additional descriptions of piston 202, activating lever 204, retractable rail 206, and ball screw are provided in the paragraphs herein and are illustrated in at least FIGS. 3-5B. Motor assembly 200 also includes a housing 220 that houses a motor 203, a gearbox 205, and brake 201. Motor 203 and gearbox 205 supply and control motive power to linear actuator 212, such as to the ball screw of linear actuator 212, which in turn shifts piston 212 to actuate a device or load (not shown) that is coupled to motor assembly 200 and positioned to the right of thrust bearing 210. Brake 201 is configured to hold piston 202 in the third piston position (as illustrated in FIG. 3C) or another desired position to overcome any drive back force from the device or load.

In some embodiments, brake 201 is subsequently disengaged to allow the drive back force from the device or load to shift piston 202 from the third piston position towards the first piston position. In some embodiments, gears of motor assembly have a shallow angle profile as the gears rotate in a direction to drive piston forward, and a steep angle profile as the gears rotate in an opposite direction to retract the piston, where the steeper angle profile slows the rotation speed of the gears while piston 202 is being retracted. As referred to herein, piston 202 is driven forward when the piston is shifted or caused to shift away from the initial or first piston position, such as the position illustrated in FIG. 4A, and is retracted when the piston is driven shifted or caused to shift towards the first piston position. Operations described to drive piston 202 forward and retract piston 202 are provided herein and are illustrated in at least FIGS. 4A-4C, and 4C-4E, respectively. In some embodiments, motor assembly 200 includes a cantilever spring (not shown) that is coupled to the gears, where the cantilever spring permits rotation of the gears in one direction (e.g., in the direction that drives piston 202 forward) but reduces gear speed or prevents the gears from rotating at a speed greater than a threshold speed in the opposite direction. In some embodiments, brake 201 also engages the gears when the piston is retracting to reduce gear speed or to prevent gear speed from reaching above a threshold speed while the piston is retracting.

Figure 3:
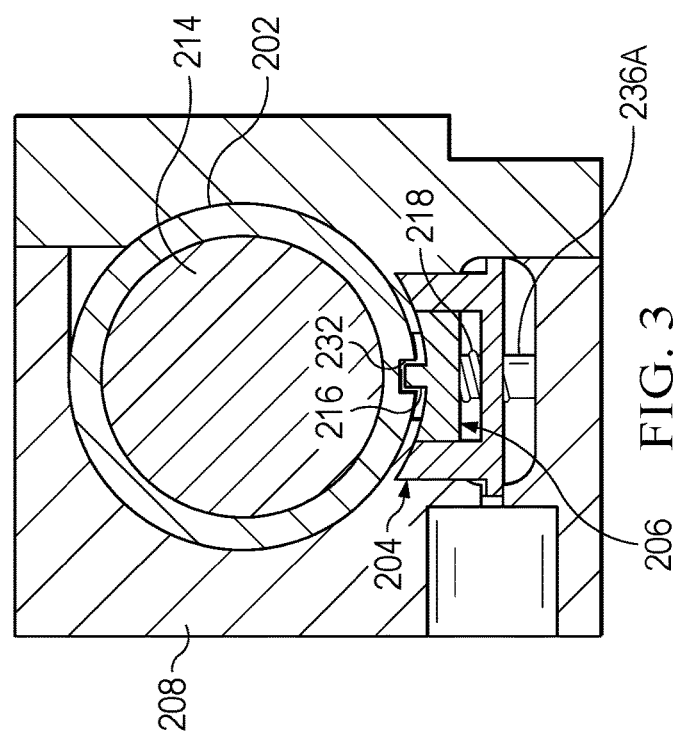
FIG. 3 is a cross-sectional view of the linear actuator of FIG. 2.

FIG. 3 is a cross-sectional view of the linear actuator 212 of FIG. 2. In the embodiment of FIG. 3, ball screw 214 is positioned within an interior of piston 202. In the embodiment of FIG. 3, ball screw 214 and piston 202 are coupled such that when motor 203 of FIG. 2 rotates ball screw in a direction (such as a clockwise direction), piston 202 is driven forward from the first piston position to the second piston position. In some embodiments, motor 203 also rotates ball screw in another direction (such as a counter-clockwise direction), which in turn drives piston 202 backwards. Piston 202 is positioned within chassis 208 and over activating lever 204 and retractable rail 206. Moreover, piston 202 has a piston slot 232 which is engaged to a retractable rail tab 216 of retractable rail 206. In the embodiment of FIG. 3, retractable rail tab 216 is a tab that runs longitudinally along retractable rail 206. Moreover, retractable rail tab 216 is positioned in a groove of piston slot 232 such that the retractable rail tab 216 prevents rotation of piston 202 while retractable rail tab 216 remains within piston slot 232. Retractable rail 206 has a leg 236A that is coupled to a spring 218. As activating lever shifts from a first activating lever position to a second activating lever position, force applied by activating lever 204 shifts retractable rail 206 downwards from a first retractable rail position to a second retractable rail position, retractable rail 206 compresses spring 218 from a natural position illustrated in FIG. 3 to a compressed position (not shown). Force released by spring 218 returning to the natural state subsequently facilitates shifting retractable rail from the second retractable rail position to the first retractable rail position. Additional descriptions and illustrations of various positions of piston 202, activating lever 204, and retractable rail 206 are provided herein and are illustrated in FIGS. 4A-4G.

Now turning to FIG. 4A, FIG. 4A is a side view of linear actuator 212 of FIG. 2 while piston 202 is in a first piston position. Moreover, In the embodiment of FIG. 4A, activating lever 204 and retractable rail 206 are in a first activating lever position and first retractable rail position, respectively. In the embodiment of FIG. 4A, ball screw 214 is coupled to piston 202 such that when motor 203 of FIG. 2 rotates ball screw 214, (e.g., in a clockwise direction), piston 202 is driven forward from the first piston position to the second piston position. Further, piston 202 is positioned above retractable rail 206 such that retractable rail tab 216 is positioned within a groove of piston slot 232 (shown in FIGS. 3 and 4E) and remains coupled or engaged to piston slot 232 to prevent rotation of piston 202. The coupling or engagement of piston slot 232 and retractable rail tab 216 forms an anti-rotation mechanism that allows piston 202 to slidingly shift from the first piston position illustrated in FIG. 4A towards a second piston position illustrated in FIG. 4B. Retractable rail 206 also includes protrusions 226A, 226B, and 226C, which are fitted through (or partially through) openings 224A, 224B, and 224C of activating lever 204, respectively. Moreover, retractable rail 206 also includes legs such as leg 236A.

In the embodiment of FIG. 4A, each of openings 224A, 224B, and 224C of activating lever 204 has a profile 234A, 234B, and 234C, respectively. Activating lever 204 also has a shoulder 244 and an activating lever slot 264 that extends from shoulder. In the embodiment of FIG. 4A, piston 202 has a piston tab 222 which is aligned with activating lever slot 264 such that piston tab 222 is configured to slide within a groove of activating lever slot 264 as piston 202 shifts from the first piston position illustrated in FIG. 4A to the second piston position illustrated in FIG. 4B.

In that regard, FIG. 4B is a side view of linear actuator 212 of FIG. 2 after piston 202 has shifted from the first piston position illustrated in FIG. 4A to the second piston position illustrated in FIG. 4B, which is the moment piston 202 engages shoulder 244 of activating lever 204. In the embodiment of FIG. 4B, activating lever 204 and retractable rail 206 remain in the first activating lever position and the first retractable rail position, respectively. Moreover, as motor 203 of FIG. 2 rotates ball screw 214, retractable rail tab 216 remains partially positioned within the groove of piston slot 232 (shown in FIGS. 3 and 4E) to form an anti-rotation mechanism that prevents rotation of piston 202. Further, piston tab 222 (shown in FIGS. 4A, 4D, 4E, and 4G) has slid into a groove of activating lever slot 264 to form a second anti-rotation mechanism that prevents rotation of piston 202.

As when motor 203 of FIG. 2 continues to rotate ball screw 214, piston 202 is driven forward from the second piston position to a third piston position. Force applied by piston 202 onto shoulder 244 of activating lever 204 in turn shifts activating lever 204 from the first activating lever position shown in FIG. 4B to towards the second activating lever position shown in FIG. 4C. As activating lever 204 shifts from the first activating lever position to the second activating lever position, activating lever 204 applies a force to protrusions 226A-226C to shift protrusions 226A-226C down profile 234A-234C of openings 224A-224C of activating lever 204, respectively. Moreover, force applied to protrusions 226A-226C also shifts retractable rail 204 from the first retractable rail position illustrated in FIG. 4B towards the second retractable rail position illustrated in FIG. 4C.

In that regard, FIG. 4C is a side view of linear actuator 212 of FIG. 2 after piston 202 has shifted from the second piston position illustrated in FIG. 4B to a third piston position, which is the moment piston 202 reaches a fully extended position. In the embodiment of FIG. 4C, activating lever 204 and retractable rail 206 have shifted to the second activating lever position and the second retractable rail position, respectively. More particularly, force applied by piston 202 to shoulder 244 has shifted activating lever 204 to the second activating lever position. Moreover, force applied by activating lever 204 to protrusions 226A-226C has shifted protrusions 226A-226C or caused protrusions 226A-226C to be shifted down profiles 234A-234C to respective positions of protrusions 226A-226C as illustrated in FIG. 4C. The shifting of protrusions 226A-226C from their respective positions as illustrated in FIG. 4B to their respective positions as illustrated in FIG. 4C also shifts retractable rail 206 and legs including leg 236A downward from the first retractable rail position illustrated in FIG. 4B to the second retractable rail position as illustrated in FIG. 4C. While retractable rail 206 is in the second retractable rail position, retractable rail tab 216 is no longer positioned within the groove of piston slot 232 (shown in FIGS. 3 and 4E). However, piston tab 222 (shown in FIGS. 4A, 4D, 4E, and 4G) remains in the groove of activating lever slot 264 to maintain the second anti-rotation mechanism to prevent rotation of piston 202.

In some embodiments, where linear actuator 212 is coupled to a device or load, such as device or load 113 of FIG. 1, motor 203 of motor assembly 200 in FIG. 2, which is coupled to ball screw 214, is powered off, and brake 201 of motor assembly 200 is engaged to hold piston 202 in the third piston position and to overcome any drive back force from the device or load. For example, where linear actuator 212 is coupled to a valve, and the operations illustrated in FIGS. 4A-4C are performed to open the valve, brake 201 is engaged to maintain the valve in an open position for a desired period of time. Similarly, where linear actuator 212 is coupled to a load, brake 201, and the operations illustrated in FIGS. 4A-4C are performed to actuate the load, such as to shift the load to a desire location), brake 201 is engaged to maintain the load at the desired location for a desired period of time until a determination is made to drive piston 201 to the first piston position. At this time, brake 201 is disengaged to allow the drive back force from the device or load or another force to shift piston 202 back towards the first piston position. Initially, and while piston tab 222 remains partially within the groove of linear actuator slot 264 to maintain the second anti-rotation mechanism, force applied to piston 202 linearly shifts piston 202 from the third piston position back towards the first piston position.

In that regard, FIG. 4D is a side view of linear actuator 212 of FIG. 2 after piston 202 has shifted from the third piston position to a fourth piston position and towards the first piston position, where the fourth piston position is the moment piston tab 222 is no longer positioned within the groove of activating lever slot 264. In the embodiment of FIG. 4D, activating lever 204 and retractable rail 206 remain in the second activating lever position and the second retractable rail position, respectively. Moreover, neither the first anti-rotation mechanism nor the second anti-rotation mechanism is engaged to prevent rotation of piston 202. As such, force (such as the drive back force from the device or load) applied to linear actuator 212 causes piston 202 to rotate with respect to ball screw 214 as piston 202 shifts from the fourth piston position illustrated in FIG. 4D towards the first piston position illustrated in FIG. 4A.

Figure 4E:
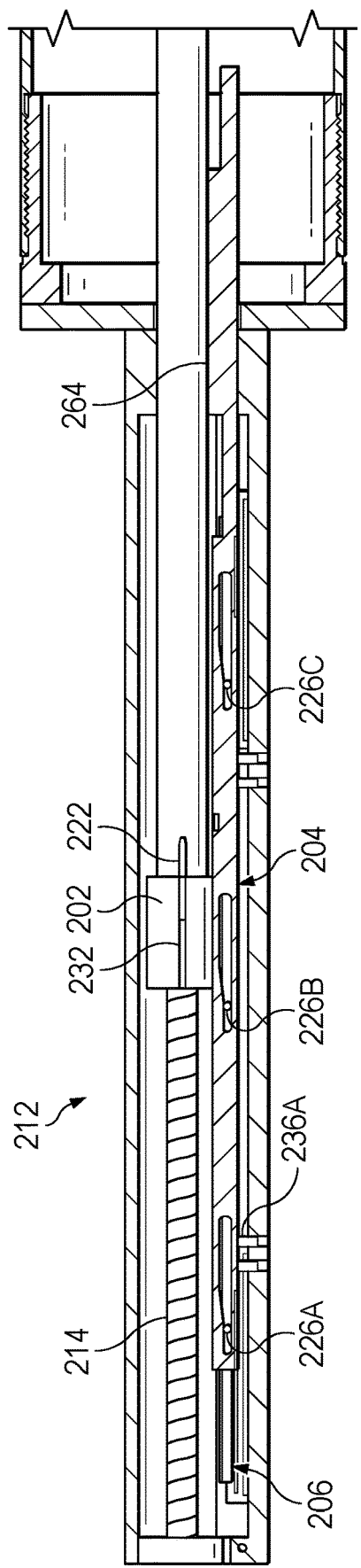
FIG. 4E is a side view of the linear actuator of FIG. 2 while the piston is rotatably shifting from the fourth piston position towards a fifth piston position and towards the first piston position.
Figure 4F:
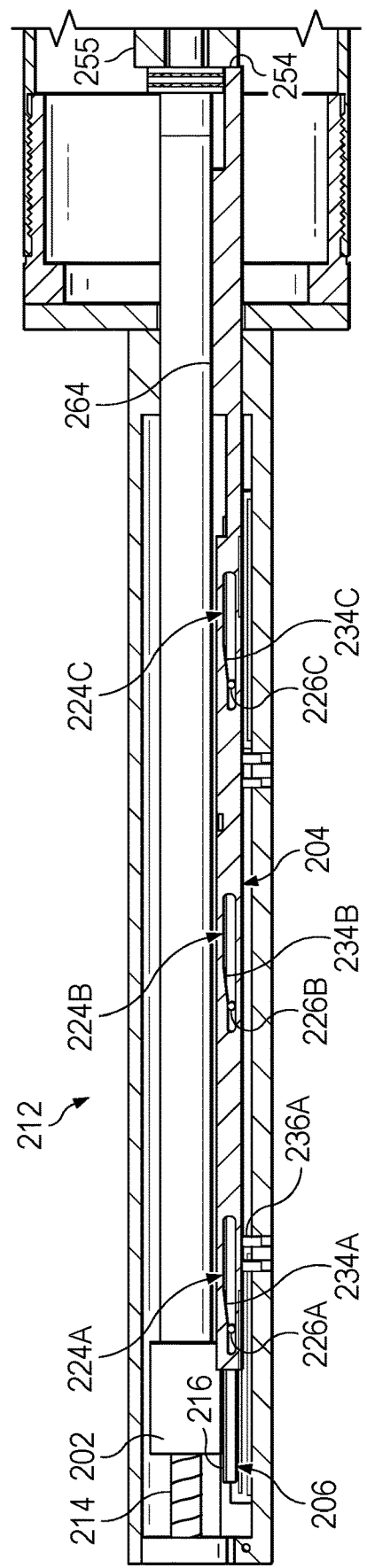
FIG. 4F is a side view of the linear actuator of FIG. 2 after the piston has shifted from the fourth piston position to the fifth piston position and towards the first piston position.
Figure 4G:
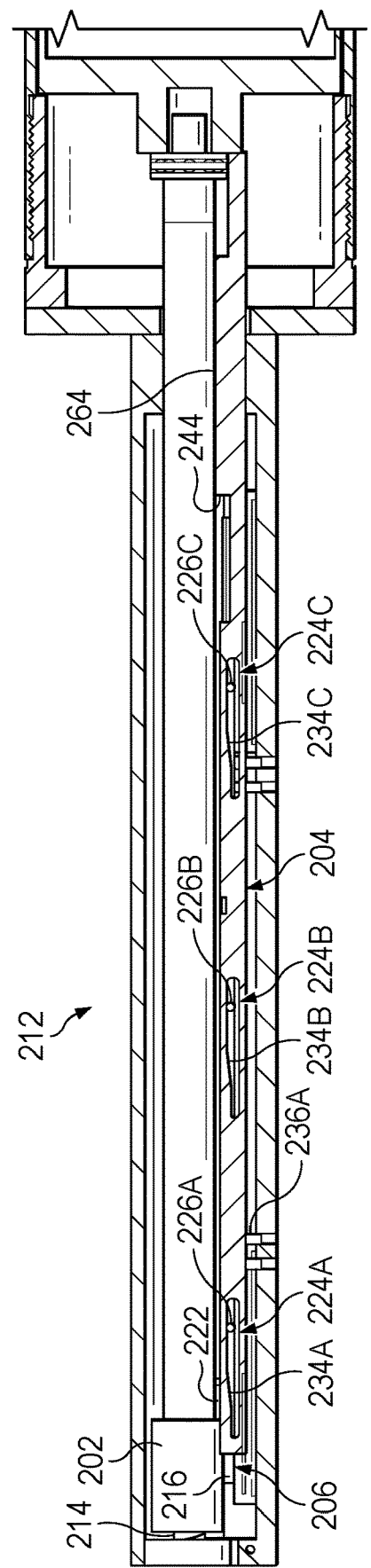
FIG. 4G is a side view of the linear actuator of FIG. 2 when the piston has shifted from the fifth piston position to the first piston position.

In that regard, FIG. 4E is a side view of linear actuator 212 of FIG. 2 while piston 202 is rotatably shifting from the fourth piston position illustrated in FIG. 4D towards a fifth piston position as illustrated in FIG. 4F and the first piston position as illustrated in FIG. 4A. In the embodiment of FIG. 4E, piston slot 232 and piston tab 222, which were previously not illustrated or partially illustrated due to the position of piston 202, are now visible due to the rotation of piston 202 with respect to ball screw 214. In the embodiment of FIG. 4E, piston 202 rotates in a clockwise direction as piston 202 shifts from the fourth piston position towards the first piston position. In some embodiments, piston 202 rotates in a counterclockwise direction as piston 202 shifts from the fourth piston position towards the first piston position.

FIG. 4F is a side view of linear actuator 212 of FIG. 2 after piston 212 has shifted from the fourth piston position illustrated to FIG. 4D to the fifth piston position illustrated in FIG. 4F and towards the first piston position, where the fifth piston position is the position of the piston the moment a force, such as force applied by load 255 is applied to a second shoulder 254 of activating lever 204. In the embodiment of FIG. 4F, activating lever 204 and retractable rail 206 remain in the second activating lever position and the second retractable rail position, respectively. Moreover, neither the first anti-rotation mechanism nor the second anti-rotation mechanism is engaged to prevent rotation of piston 202. As such, force applied by load 255 continues to cause piston 202 to rotate. However, force applied by load 255 to second should 254 also shifts the activating lever 204 from the second activating lever position illustrated in FIG. 4F to the first activating lever position illustrated in FIGS. 4A and 4G. Moreover, as activating lever 204 shifts from the second activating lever position to towards the first activating lever position, activating lever 204 in turn applies a force to protrusions 226A-226C, which shifts protrusions 226A-226C up profiles 234A-234C, respectively. Force applied by activating lever 204 to shift protrusions 226A-226C also shifts retractable rail from the second retractable rail position illustrated in FIG. 4F to the first retractable rail position illustrated in FIGS. 4A and 4G. As retractable rail 206 shifts from the second retractable rail position to the first retractable rail position, a portion of retractable rail tab 216 shifts back into the groove of piston slot 232 (shown in FIGS. 3 and 4E) thereby forming the anti-rotation mechanism to prevent rotation of piston 202.

In that regard, FIG. 4G is a side view of linear actuator 212 of FIG. 2 when piston has shifted from the fifth piston position to the first piston position. The embodiment of FIG. 4G is similar to the embodiment illustrated in FIG. 4A, such that piston 202, activating lever 204, and retractable rail 206 are in the first piston position, first activating lever position, and first retractable rail position, respectively. Moreover, components of piston 202, activating lever 204, and retractable rail 206, including piston tab 222, retractable rail tab 216, protrusions 226A-226C, and leg 236A are in substantially similar or identical positions as illustrated in FIG. 4A. In some embodiments, motor 203 of FIG. 2 receives additional instructions to rotate ball screw 214 to drive piston 202 forward, and the operations described herein and illustrated in FIGS. 4A-4G are repeated.

Figure 5:
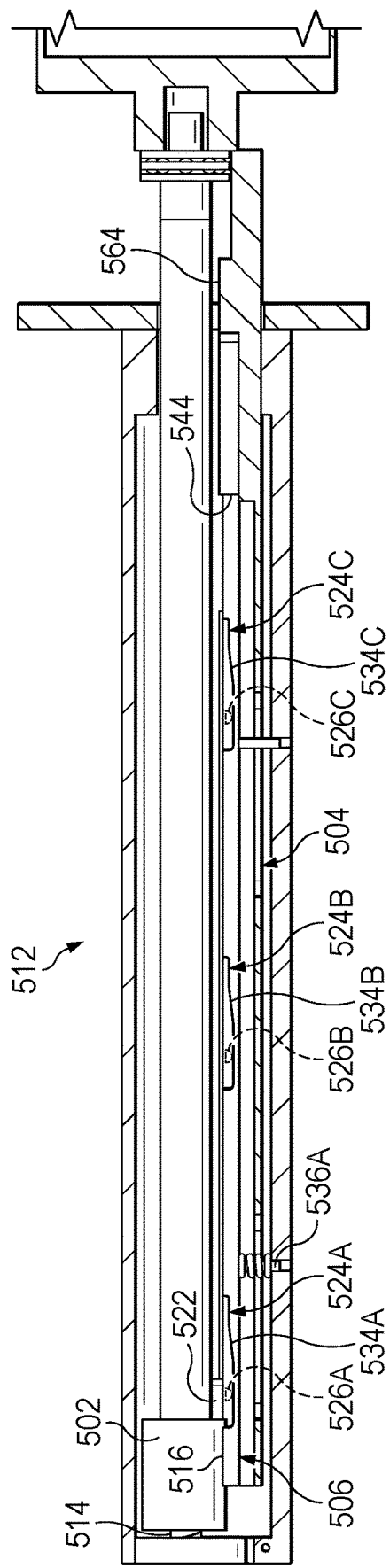
FIG. 5 is a side view of a linear actuator similar to the linear actuator of FIG. 4A while the piston is in a first piston position.

FIG. 5 is a side view of a linear actuator 512 similar to linear actuator 212 of FIG. 4A while a piston 502 is in a first piston position. Linear actuator 512 has a piston 502, a ball screw 514, a retractable rail tab 516, a piston tab 522, a leg 536A, a shoulder 544, and an activating lever slot 564 that are similar or identical to piston 202, ball screw 214, retractable rail tab 216, piston tab 222, leg 236A, a shoulder 244, and activating lever slot 264 of linear actuator 212, which are described herein and illustrated in at least FIGS. 4A-4G. Linear actuator 512 has an activating lever 504 and a retractable rail 506 configured to shift to positions similar or identical to the positions of activating lever 204 and retractable rail 206 as illustrated in FIGS. 4A-4G, and described herein. Retractable rail has three openings 524A, 524B, and 524C, having profiles 234A, 234B, and 234C, respectively, where openings 524A, 524B, and 524C and profiles 234A, 234B, and 234C are similar or identical to openings 224A, 224B, and 224C and profiles 234A, 234B, and 234C of activating lever 204 of FIG. 4A. Activating lever 504 has inwardly facing protrusions 526A-526C that are similar or identical to protrusions 226A-226C of retractable rail 206, such that when linear actuator 512 shifts (such as to the positions illustrated in FIGS. 4A-4G), protrusions 526A-526C of activating lever 204 shift or slide along corresponding openings 524A, 524B, and 524C of retractable rail 506. Detailed illustrations of activating lever 504 and retractable rail 506 are illustrated in FIGS. 6A and 6B.

Figure 6A:
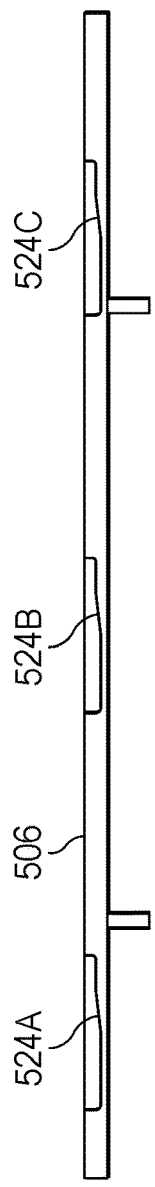
FIG. 6A is a side view of an retractable rail of the linear actuator of FIG. 5.
Figure 6B:
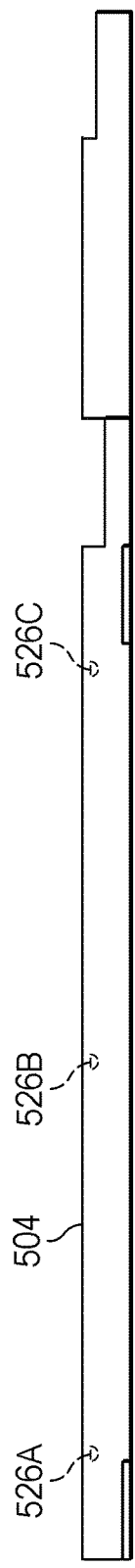
FIG. 6B is a side view of an activating lever of the linear actuator of FIG. 5.

FIG. 6A is a side view of retractable rail 506 of linear actuator 512 of FIG. 5. FIG. 6B is a side view of activating lever 504 of linear actuator 512 of FIG. 5. Activating lever 504 has three inwardly facing protrusions 526A-526C that are configured to engage, shift, and slide within corresponding grooves 524A-524C of retractable rail 506 as linear actuator 512 shifts, such as between the positions illustrated in FIGS. 4A-4G.

Figure 7A:
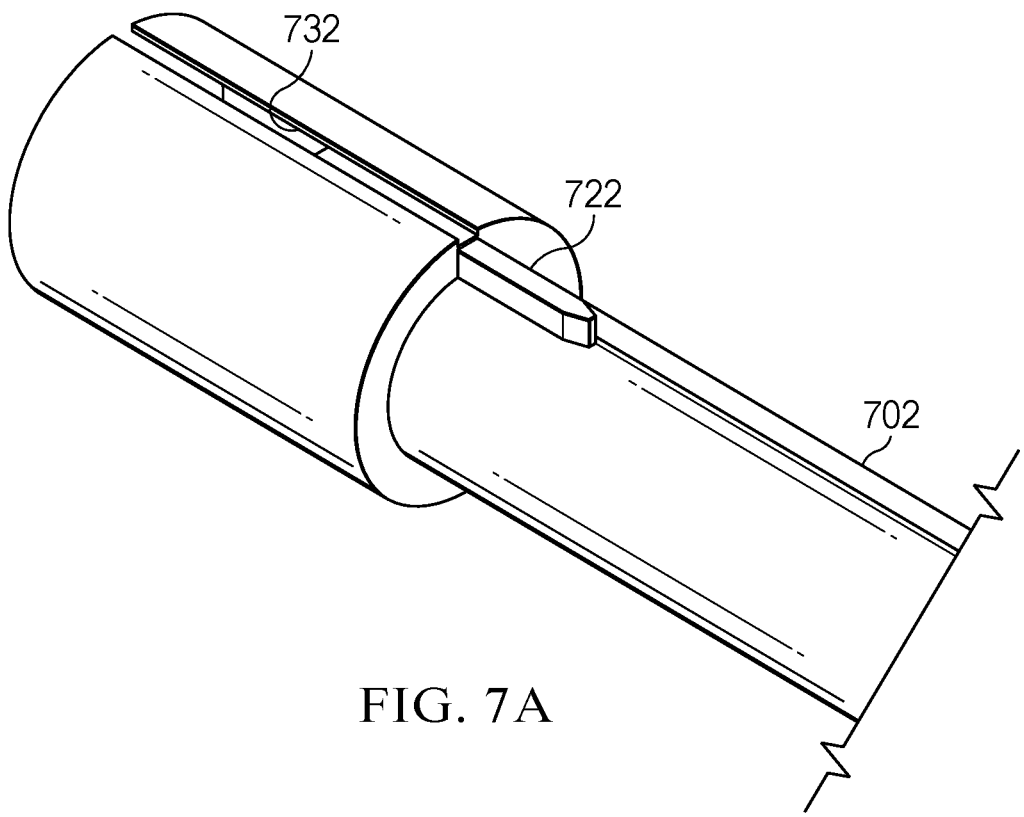
FIG. 7A is a perspective view of a piston similar to the piston of FIG. 2 and having a piston slot and a piston tab.
Figure 7B:
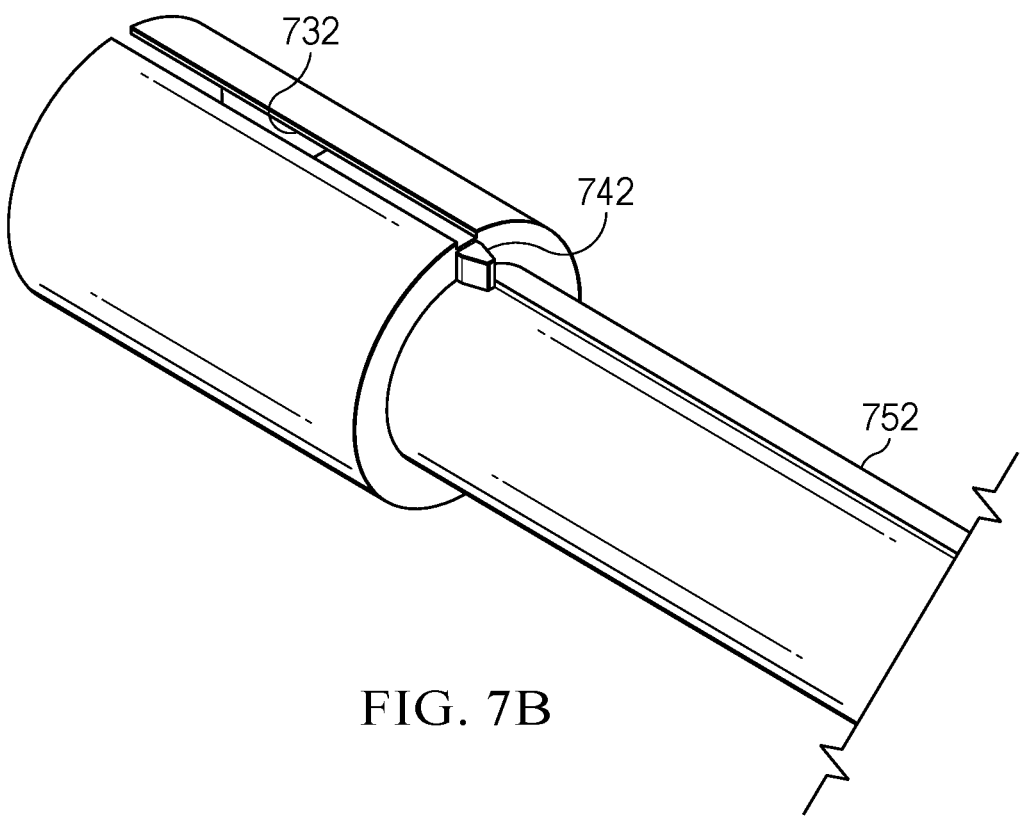
FIG. 7B is a perspective view of another piston similar to the piston of FIG. 2 and having a piston slot and another type of piston tab.

FIG. 7A is a perspective view of a piston 702 similar to the piston 202 of FIG. 2 and having a piston slot 732 and a piston tab 722 of a first length. FIG. 7B is a perspective view of piston 752 and similar to piston 202 of FIG. 2 and having a piston slot 732 and another type of piston tab 742 of a second length. In some embodiments, the length of the piston tab is determined based on a desired amount of anti-rotation force, guidance to engage the piston tab to the activating lever slot, and the threshold rotation of the ball screw, motor, or gear during retraction, such as when piston 202 of FIGS. 4A-4E is rotating while shifting from the fourth piston position illustrated in FIG. 4D towards the first piston position illustrated in FIGS. 4A and 4G. For example, piston tab 722 of FIG. 7A provides additional guidance to engage piston tab 722 to the activating lever slot, whereas piston tab 742 contributes to less reverse rotation of other components of the motor assembly, such as the ball screw, motor, and/or gear during retraction. In some embodiments, pistons tabs include additional lengths, sizes, and shapes.

Figure 8:
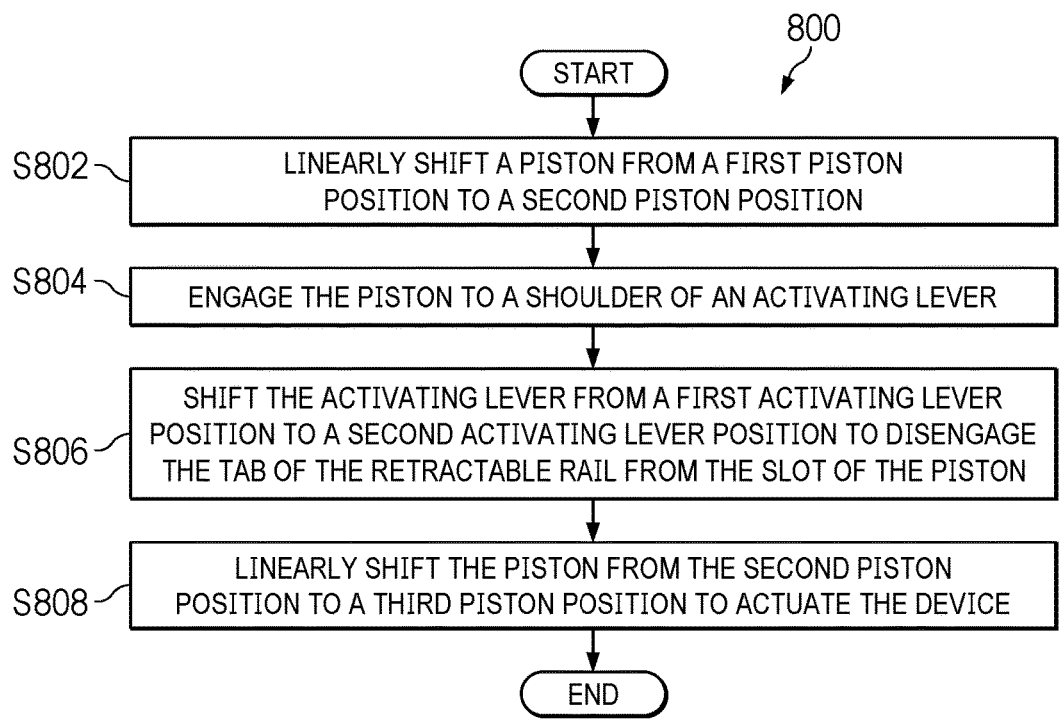
FIG. 8 is a flow chart illustrating a process to actuate a device.

FIG. 8 is a flow chart illustrating a process 800 to actuate a device. Although the operations in process 800 are shown in a particular sequence, certain operations may be performed in different sequences or at the same time where feasible.

At block S802, a piston is linearly shifted from a first piston position to a second piston position. In that regard, motor 203 and gearbox 205 of FIG. 2 supply and control motive power to ball screw 214 of FIG. 4A of linear actuator 212, which in turn drives piston 202 forward. Further, FIGS. 4A-4B illustrate shifting piston 202 from the first piston position illustrated in FIG. 4A to the second piston position illustrated in FIG. 4B. Further, FIGS. 4A-4B illustrate that while piston 202 is in the first and second piston positions, retractable rail tab 216 is partially positioned within a groove of piston slot 232 to form an anti-rotation mechanism to prevent piston 202 from rotating as it shifts from the first piston position to the second piston position.

At block S804, the piston is engaged to a shoulder of an activating lever. In that regard, FIG. 4B illustrates engaging piston 202 to shoulder 244 of activating lever 204. At block S806, the activating lever is shifted from a first activating lever position to a second activating lever position to disengage the retractable rail tab of the retractable rail from the piston slot. In that regard, FIGS. 4B-4C illustrate activating lever 204 shifting from the first activating lever position illustrated in FIG. 4B to the second activating lever position illustrated in FIG. 4C. The shifting of activating lever 204 in turn applies a force to retractable rail 206 to shift retractable rail 206 downward from the first retracting rail position illustrated in FIG. 4B to the second retracting rail position illustrated in FIG. 4C as activating lever 204 shifts from the first activating lever position to the second activating lever position. The downward shift of retractable rail 206 in turn disengages retracting rail tab 216 from piston slot 232.

At block S808, the piston is linearly shifted from the second piston position to the third piston position to actuate a device. In that regard, FIGS. 4B-4C illustrates piston 202 shifting from the second piston position illustrated in FIG. 4B to the third piston position illustrated in FIG. 4C. Moreover, where piston 202 or linear actuator 212 is coupled to a device, operations performed to shift piston 202 from the first piston position to the third piston position in turn actuates the device. For example, where the device is a valve that is coupled to the linear actuator, driving the piston from the first piston position to the third piston position actuates (opens) the valve. In another example, where the device is a packer, driving the piston from the first piston position to the third piston position actuates (sets) the packer. In some embodiments, while the device is actuated, a motor of a motor assembly that provides motive power to shift and drive the piston is turned off, and a brake of the motor assembly is engaged to hold the piston in position while the device remains actuated for a desired or determined period of time. The brake is subsequently disengaged to allow the piston to reverse from the third piston position towards the first piston position. Additional descriptions of operations performed to drive the piston forward and to reverse the piston are provided herein and are illustrated in at least FIGS. 4A-4G. In some embodiments, after the piston is reversed to the original or first piston position, operations at blocks S802, S804, S806, and S808 are repeated a threshold number of times to actuate the device for the threshold number of times.

Figure 9:
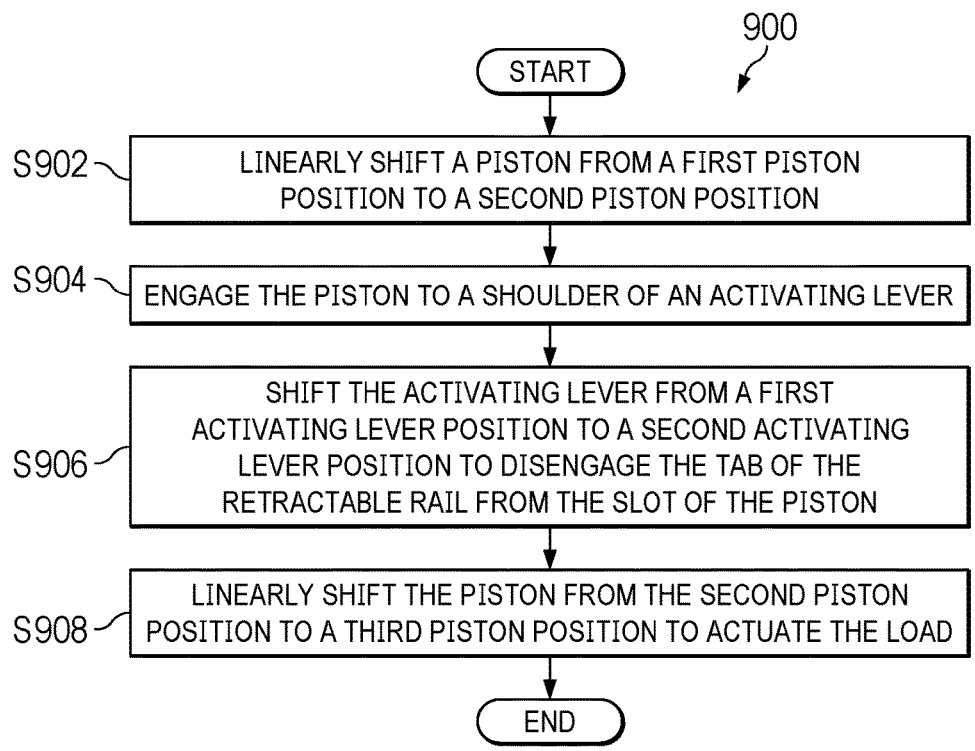
FIG. 9 is a flow chart illustrating a process to actuate a load.

FIG. 9 is a flow chart illustrating a process 900 to actuate a load. Although the operations in process 900 are shown in a particular sequence, certain operations may be performed in different sequences or at the same time where feasible.

At block S902, a piston is linearly shifted from a first piston position to a second piston position. At block S904, the piston is engaged to a shoulder of an activating lever. At block S906, the activating lever is shifted from a first activating lever position to a second activating lever position to disengage the tab of the retractable rail from the slow of the piston. The operations performed at blocks S902, S904, and S906 are similar to or identical to the operations performed at blocks S802, S804, and S806, respectively, which are described herein.

At block S908, the piston is linearly shifted from the second piston position to the third piston position to actuate a load. In that regard, FIGS. 4B-4C illustrates piston 202 shifting from the second piston position illustrated in FIG. 4B to the third piston position illustrated in FIG. 4C. Moreover, where piston 202 or linear actuator 212 is coupled to a load, operations performed to shift piston 202 from the first piston position to the third piston position in turn actuates the load. In some embodiments, the load is actuated when the load is shifted to or delivered to a desired location by extending the piston to the third piston position. In some embodiments, while the load is actuated, a motor of a motor assembly that provides motive power to shift and drive the piston is turned off, and a brake of the motor assembly is engaged to hold the piston in position while the load remains actuated for a desired or determined period of time. The brake is subsequently disengaged to allow the piston to reverse from the third piston position towards the first piston position. Additional descriptions of operations performed to drive the piston forward and to reverse the piston are provided herein and are illustrated in at least FIGS. 4A-4G. In some embodiments, after the piston is reversed to the original or first piston position, operations at blocks S902, S904, S906, and S908 are repeated a number period of times to actuate the load for the threshold number of times.

The above-disclosed embodiments have been presented for purposes of illustration and to enable one of ordinary skill in the art to practice the disclosure, but the disclosure is not intended to be exhaustive or limited to the forms disclosed. Many insubstantial modifications and variations will be apparent to those of ordinary skill in the art without departing from the scope and spirit of the disclosure. For instance, although the flowcharts depict a serial process, some of the steps/processes may be performed in parallel or out of sequence, or combined into a single step/process. The scope of the claims is intended to broadly cover the disclosed embodiments and any such modification. Further, the following clauses represent additional embodiments of the disclosure and should be considered within the scope of the disclosure.

Clause 1, A linear actuator, comprising: a piston having a piston slot and configured to: linearly shift from a first piston position to a second piston position; and rotate as the piston shifts towards the first piston position; an activating lever comprising: a shoulder that the piston engages as the piston shifts to the second piston position, wherein the activating lever is configured to shift from a first activating lever position to a second activating lever position after piston engages the shoulder; and a retractable rail configured to shift from a first retractable rail position downwards to a second retractable rail position, and comprising: a retractable rail tab positioned in a groove of the piston slot as the piston shifts from the first piston position to the second piston position and while the retractable rail is in the first retractable rail position Clause 2, the linear actuator of clause 1, wherein the piston is configured to linearly shift from the second piston position to a third piston position and away from the first piston position, and wherein the activating lever is configured to shift from the first activating lever position to the second activating lever position as the piston linearly shifts from the second piston position to the third piston position.

Clause 3, the linear actuator of clause 2, wherein the piston is configured to linearly shift from the third piston position to a fourth piston position and towards the first piston position, and wherein activating lever maintains in the second activating lever position while the piston linearly shifts from the third piston position to the fourth piston position.

Clause 4, the linear actuator of clauses 2 or 3, wherein the activating lever further comprises an activating lever slot, and wherein the piston further comprises a piston tab that is configured to slide within a groove of the activating lever slot.

Clause 5, the linear actuator of clause 4, wherein the piston tab is configured to slide into the groove of the activating lever slot before the piston engages the shoulder of the activating lever.

Clause 6, the linear actuator of clause 5, wherein at least a portion of the piston tab remains in the groove of the activating lever slot while the piston is in the second piston position and while the piston is shifting from the second piston position to the third piston position.

Clause 7, the linear actuator of any of clauses 4-6, wherein the piston tab is configured to slide into the groove of the activating lever slot while the retractable rail tab is positioned in the groove of the piston slot.

Clause 8, the linear actuator of any of clauses 2-7, wherein the protrusion is pushed down the sloped profile to shift the retractable rail from the first retractable rail position to the second retractable rail position as the activating lever shifts from the first activating lever position to the second activating lever position.

Clause 9, the linear actuator of any of clauses 2-8, wherein the activating lever comprises a second shoulder, and wherein a threshold amount of force applied to the second shoulder while the piston is shifting towards the first piston position shifts the activating lever from the second activating lever position to the first activating lever position.

Clause 10, the linear actuator of clause 9, wherein the protrusion is pushed up the sloped profile to shift the retractable rail from the second retractable rail position to the first retractable rail position as the activating lever shifts towards the first activating lever position.

Clause 11, the linear actuator of any of clauses 1-10, further comprising a spring that is compressed from a natural state to a compressed state as the retractable rail shifts from the first retractable rail position to the second retractable rail position, and wherein a force applied by the spring returning to the natural state shifts the retractable rail from the second retractable rail position to the first retractable rail position.

Clause 12, the linear actuator of any of clauses 1-11, further comprising a ball screw that is coupled to the piston and configured to rotate in a first direction to linearly shift the piston from the first piston position to the second piston position.

Clause 13, the linear actuator of any of clauses 1-12, wherein the activating lever further comprises an opening having a sloped profile along a side of the activating lever, and wherein the retractable rail further comprises a protrusion positioned along a side of the retractable rail and fitted in the opening, wherein as the activating lever shifts from the first activating lever position to the second activating lever position, the protrusion is pushed down the sloped profile to shift the retractable rail to the second retractable rail position, and wherein the retractable rail tab is not positioned within the groove of the piston slot while the retractable rail is in the second retractable rail position.

Clause 14, the linear actuator of any of clauses 1-12, linear actuator of claim 1, wherein the retractable rail further comprises an opening having a sloped profile along a side of the retractable rail, and wherein the activating lever further comprises a protrusion positioned along a side of the activating lever and fitted in the opening, wherein as the activating lever shifts from the first activating lever position to the second activating lever position, the protrusion is pushed down the sloped profile to shift the retractable rail to the second retractable rail position, and wherein the retractable rail tab is not positioned within the groove of the piston slot while the retractable rail is in the second retractable rail position.

Clause 15, a motor assembly, comprising: a motor; a gearbox; and a linear actuator that is coupled to the motor, comprising: a piston having a piston slot and configured to: linearly shift from a first piston position to a second piston position; and rotate as the piston shifts towards the first piston position; an activating lever comprising: an opening having a sloped profile along a side of the activating lever; and a shoulder that the piston engages as the piston shifts to the second piston position, wherein the activating lever is configured to shift from a first activating lever position to a second activating lever position after piston engages the shoulder; and a retractable rail configured to shift from a first retractable rail position downwards to a second retractable rail position, and comprising: a retractable rail tab positioned in a groove of the piston slot as the piston shifts from the first piston position to the second piston position and while the retractable rail is in the first retractable rail position; and a protrusion positioned along a side of the retractable rail and fitted in the opening, wherein as the activating lever shifts from the first activating lever position to the second activating lever position, the protrusion is pushed down the sloped profile to shift the retractable rail to the second retractable rail position, and wherein the retractable rail tab is not positioned within the groove of the piston slot while the retractable rail is in the second retractable rail position.

Clause 16, the motor assembly of clause 15, wherein the piston is configured to linearly shift from the second piston position to a third piston position and away from the first piston position, and wherein the activating lever is configured to shift from the first activating lever position to the second activating lever position as the piston linearly shifts from the second piston position to the third piston position.

Clause 17, the motor assembly of clause 16, wherein the piston is configured to linearly shift from the third piston position to a fourth piston position and towards the first piston position, and wherein activating lever maintains in the second activating lever position while the piston linearly shifts from the third piston position to the fourth piston position.

Clause 18, the motor assembly of any of clauses 15-17, wherein the activating lever further comprises an activating lever slot, and wherein the piston further comprises a piston tab that is configured to slide within a groove of the activating lever slot before the piston engages the shoulder of the activating lever.

Clause 19, the motor assembly of any of clauses 15-18, further comprising a spring that is compressed from a natural state to a compressed state as the retractable rail shifts from the first retractable rail position to the second retractable rail position, and wherein a force applied by the spring returning to the natural state shifts the retractable rail from the second retractable rail position to the first retractable rail position.

Clause 20, the motor assembly of any of clauses 15-19, further comprising a ball screw that is coupled to the piston and configured to rotate in a first direction to linearly shift the piston from the first piston position to the second piston position.

Clause 21, the motor assembly of any of clauses 15-20, wherein the activating lever further comprises an opening having a sloped profile along a side of the activating lever, and wherein the retractable rail further comprises a protrusion positioned along a side of the retractable rail and fitted in the opening, wherein as the activating lever shifts from the first activating lever position to the second activating lever position, the protrusion is pushed down the sloped profile to shift the retractable rail to the second retractable rail position, and wherein the retractable rail tab is not positioned within the groove of the piston slot while the retractable rail is in the second retractable rail position.

Clause 22, the motor assembly of any of clauses 15-20, wherein the retractable rail further comprises an opening having a sloped profile along a side of the retractable rail, and wherein the activating lever further comprises a protrusion positioned along a side of the activating lever and fitted in the opening, wherein as the activating lever shifts from the first activating lever position to the second activating lever position, the protrusion is pushed down the sloped profile to shift the retractable rail to the second retractable rail position, and wherein the retractable rail tab is not positioned within the groove of the piston slot while the retractable rail is in the second retractable rail position.

Clause 23, a method to actuate a device, comprising: linearly shifting a piston from a first piston position to a second piston position, the piston having a piston slot that is engaged with a retractable rail tab of a retractable rail while the piston shifts from the first piston position to the second piston position; engaging the piston to a shoulder of an activating lever; shifting the activating lever from a first activating lever position to a second activating lever position to disengage the retractable rail tab from the piston slot; and linearly shifting the piston from the second piston position to a third piston position and away from the first piston position to actuate the device.

Clause 24, the method of clause 23, wherein the activating lever comprises an opening having a sloped profile along a side of the activating lever, and wherein the retractable rail comprises a protrusion positioned along a side of the retractable rail and fitted in the opening, and the method further comprising pushing the retractable rail down the sloped profile to shift the retractable rail from a first retractable rail position to a second retractable rail position, wherein the retractable rail tab is disengaged from the piston slot while the retractable rail is in the second retractable rail position.

As used herein, the singular forms "a", "an" and "the" are intended to include the plural forms as well, unless the context clearly indicates otherwise. It will be further understood that the terms "comprise" and/or "comprising," when used in this specification and/or the claims, specify the presence of stated features, steps, operations, elements, and/or components, but do not preclude the presence or addition of one or more other features, steps, operations, elements, components, and/or groups thereof. In addition, the steps and components described in the above embodiments and figures are merely illustrative and do not imply that any particular step or component is a requirement of a claimed embodiment.

What is claimed is:

1. A linear actuator, comprising:
a piston having a piston slot and configured to:
linearly shift from a first piston position to a second piston position; and
rotate as the piston shifts towards the first piston position;
an activating lever comprising:
a shoulder that the piston engages as the piston shifts to the second piston position,
wherein the activating lever is configured to shift from a first activating lever position to a second activating lever position after piston engages the shoulder; and
a retractable rail configured to shift from a first retractable rail position downwards to a second retractable rail position, and comprising:
a retractable rail tab positioned in a groove of the piston slot as the piston shifts from the first piston position to the second piston position and while the retractable rail is in the first retractable rail position.

2. The linear actuator of claim 1, wherein the piston is configured to linearly shift from the second piston position to a third piston position and away from the first piston position, and wherein the activating lever is configured to shift from the first activating lever position to the second activating lever position as the piston linearly shifts from the second piston position to the third piston position.

3. The linear actuator of claim 2, wherein the piston is configured to linearly shift from the third piston position to a fourth piston position and towards the first piston position, and wherein activating lever maintains in the second activating lever position while the piston linearly shifts from the third piston position to the fourth piston position.

4. The linear actuator of claim 2, wherein the activating lever further comprises an activating lever slot, and wherein the piston further comprises a piston tab that is configured to slide within a groove of the activating lever slot.

5. The linear actuator of claim 4, wherein the piston tab is configured to slide into the groove of the activating lever slot before the piston engages the shoulder of the activating lever.

6. The linear actuator of claim 5, wherein at least a portion of the piston tab remains in the groove of the activating lever slot while the piston is in the second piston position and while the piston is shifting from the second piston position to the third piston position.

7. The linear actuator of claim 4, wherein the piston tab is configured to slide into the groove of the activating lever slot while the retractable rail tab is positioned in the groove of the piston slot.

8. The linear actuator of claim 2, wherein the protrusion is pushed down the sloped profile to shift the retractable rail from the first retractable rail position to the second retractable rail position as the activating lever shifts from the first activating lever position to the second activating lever position.

9. The linear actuator of claim 2, wherein the activating lever comprises a second shoulder, and wherein a threshold amount of force applied to the second shoulder while the piston is shifting towards the first piston position shifts the activating lever from the second activating lever position to the first activating lever position.

10. The linear actuator of claim 9, wherein the protrusion is pushed up the sloped profile to shift the retractable rail from the second retractable rail position to the first retractable rail position as the activating lever shifts towards the first activating lever position.

11. The linear actuator of claim 1, further comprising a spring that is compressed from a natural state to a compressed state as the retractable rail shifts from the first retractable rail position to the second retractable rail position, and wherein a force applied by the spring returning to the natural state shifts the retractable rail from the second retractable rail position to the first retractable rail position.

12. The linear actuator of claim 1, further comprising a ball screw that is coupled to the piston and configured to rotate in a first direction to linearly shift the piston from the first piston position to the second piston position.

13. The linear actuator of claim 1, wherein the activating lever further comprises an opening having a sloped profile along a side of the activating lever, and wherein the retractable rail further comprises a protrusion positioned along a side of the retractable rail and fitted in the opening, wherein as the activating lever shifts from the first activating lever position to the second activating lever position, the protrusion is pushed down the sloped profile to shift the retractable rail to the second retractable rail position, and wherein the retractable rail tab is not positioned within the groove of the piston slot while the retractable rail is in the second retractable rail position.

14. The linear actuator of claim 1, wherein the retractable rail further comprises an opening having a sloped profile along a side of the retractable rail, and wherein the activating lever further comprises a protrusion positioned along a side of the activating lever and fitted in the opening, wherein as the activating lever shifts from the first activating lever position to the second activating lever position, the protrusion is pushed down the sloped profile to shift the retractable rail to the second retractable rail position, and wherein the retractable rail tab is not positioned within the groove of the piston slot while the retractable rail is in the second retractable rail position.

15. A motor assembly, comprising:
a motor;
a gearbox; and
a linear actuator that is coupled to the motor, comprising:
  a piston having a piston slot and configured to:
    linearly shift from a first piston position to a second piston position; and
    rotate as the piston shifts towards the first piston position;
  an activating lever comprising:
    a shoulder that the piston engages as the piston shifts to the second piston position,
    wherein the activating lever is configured to shift from a first activating lever position to a second activating lever position after piston engages the shoulder; and
  a retractable rail configured to shift from a first retractable rail position downwards to a second retractable rail position, and comprising:
    a retractable rail tab positioned in a groove of the piston slot as the piston shifts from the first piston position to the second piston position and while the retractable rail is in the first retractable rail position.

16. The motor assembly of claim 15, wherein the piston is configured to linearly shift from the second piston position to a third piston position and away from the first piston position, and wherein the activating lever is configured to shift from the first activating lever position to the second activating lever position as the piston linearly shifts from the second piston position to the third piston position.

17. The motor assembly of claim 16, wherein the piston is configured to linearly shift from the third piston position to a fourth piston position and towards the first piston position, and wherein activating lever maintains in the second activating lever position while the piston linearly shifts from the third piston position to the fourth piston position.

18. The motor assembly of claim 15, wherein the activating lever further comprises an activating lever slot, and wherein the piston further comprises a piston tab that is configured to slide within a groove of the activating lever slot before the piston engages the shoulder of the activating lever.

19. The motor assembly of claim 15, further comprising a spring that is compressed from a natural state to a compressed state as the retractable rail shifts from the first retractable rail position to the second retractable rail position, and wherein a force applied by the spring returning to the natural state shifts the retractable rail from the second retractable rail position to the first retractable rail position.

20. The motor assembly of claim 15, further comprising a ball screw that is coupled to the piston and configured to rotate in a first direction to linearly shift the piston from the first piston position to the second piston position.

21. The motor assembly of claim 15, wherein the activating lever further comprises an opening having a sloped profile along a side of the activating lever, and wherein the retractable rail further comprises a protrusion positioned along a side of the retractable rail and fitted in the opening, wherein as the activating lever shifts from the first activating lever position to the second activating lever position, the protrusion is pushed down the sloped profile to shift the retractable rail to the second retractable rail position, and wherein the retractable rail tab is not positioned within the groove of the piston slot while the retractable rail is in the second retractable rail position.

22. The motor assembly of claim 15, wherein the retractable rail further comprises an opening having a sloped profile along a side of the retractable rail, and wherein the activating lever further comprises a protrusion positioned along a side of the activating lever and fitted in the opening, wherein as the activating lever shifts from the first activating lever position to the second activating lever position, the protrusion is pushed down the sloped profile to shift the retractable rail to the second retractable rail position, and wherein the retractable rail tab is not positioned within the groove of the piston slot while the retractable rail is in the second retractable rail position.

23. A method to actuate a device, comprising:
linearly shifting a piston from a first piston position to a second piston position, the piston having a piston slot that is engaged with a retractable rail tab of a retractable rail while the piston shifts from the first piston position to the second piston position;
engaging the piston to a shoulder of an activating lever;
shifting the activating lever from a first activating lever position to a second activating lever position to disengage the retractable rail tab from the piston slot; and
linearly shifting the piston from the second piston position to a third piston position and away from the first piston position to actuate the device.

24. The method of claim 23, wherein the activating lever comprises an opening having a sloped profile along a side of the activating lever, and wherein the retractable rail comprises a protrusion positioned along a side of the retractable rail and fitted in the opening, and the method further comprising pushing the retractable rail down the sloped profile to shift the retractable rail from a first retractable rail position to a second retractable rail position, wherein the retractable rail tab is disengaged from the piston slot while the retractable rail is in the second retractable rail position.

* * * * *